March 17, 1925.
T. W. ALLEN
GARNETT TEETH
Filed Sept. 6, 1924
1,530,285
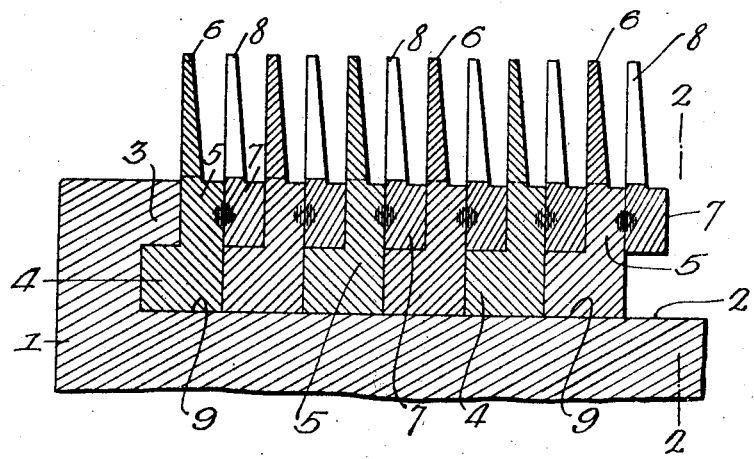
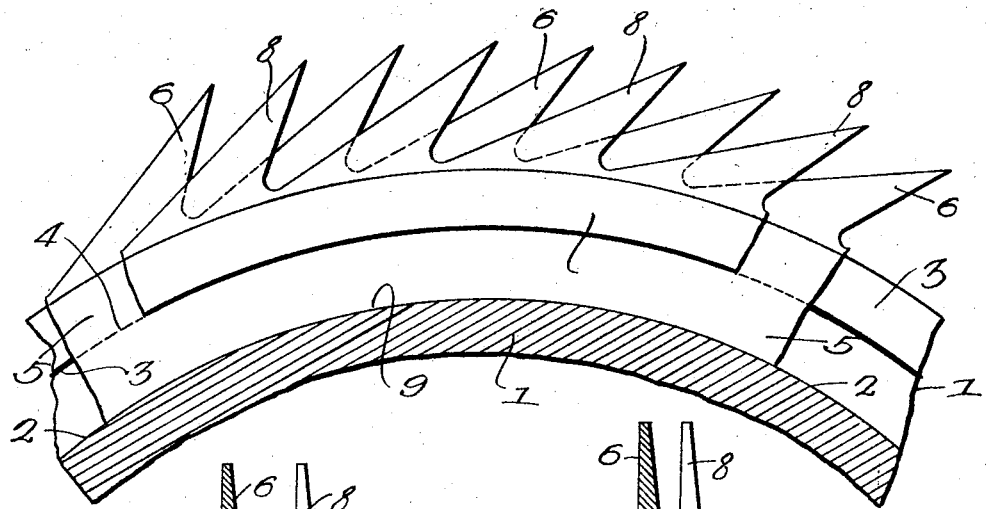
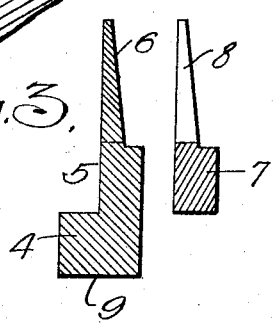
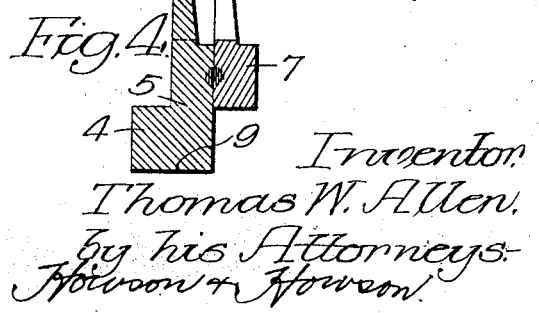
Inventor.
Thomas W. Allen.
by his Attorneys.
Howson & Howson.

Patented Mar. 17, 1925.

1,530,285

UNITED STATES PATENT OFFICE.

THOMAS W. ALLEN, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

GARNETT TEETH.

Application filed September 6, 1924. Serial No. 736,319.

*To all whom it may concern:*

Be it known that I, THOMAS W. ALLEN, a citizen of the United States, residing in Philadelphia, Pennsylvania, have invented certain Improvements in Garnett Teeth, of which the following is a specification.

One object of my invention is to construct a Garnett toothed strip so that the teeth can be arranged close together.

A further object of the invention is to provide the toothed strip with an extended base.

Another object of the invention is to provide shoulders on the toothed strip so that one convolution will overlap another convolution, thereby interlocking the entire toothed surface of the Garnett cylinder.

Still another object of the invention is to make the toothed strip in two sections, one section being welded to the other, as fully described hereinafter.

In the accompanying drawings: Fig. 1 is a sectional view of a portion of a Garnett cylinder, illustrating my improved toothed strips thereon; Fig. 2 is a side view of a portion of a toothed strip with the cylinder in section on the line 2—2, Fig. 1; Fig. 3 is a sectional view, showing the two parts of a strip detached, prior to being welded; and Fig. 4 illustrates the two parts of the strip welded together.

Referring to the drawings, 1 is a portion of a Garnett cylinder having a smooth surface 2, on which the toothed Garnett strips are wound. At one end of the cylinder, in the present instance, is an overhanging flange 3, under which a shoulder 4 of the first portion of the Garnett strip extends so that the strip will interlock with the cylinder. The strip is made as shown clearly in Figs. 3 and 4.

5 designates one strip having teeth 6. The other section 7 has teeth 8, which alternate with the teeth 6 of the the strip 5, as illustrated in Fig. 2. The shoulder 4 is formed at one side of the strip 5. This strip has a wide base 9. The strip 7 is welded to the strip 5, preferably by spot welding, as shown. The base of the strip 7 forms an overhanging shoulder, which overlaps the shoulder 4 of the adjoining convolution so that the adjoining strip is held in place by the overlapping portion of the preceding convolution.

The construction hereinbefore described provides a broad base for the teeth. The series of pairs of strips interlock, as shown in Fig. 1, which makes a substantial bearing for the teeth.

By arranging the toothed strips in the manner illustrated, the teeth can be placed close together and the base of an ajoining strip is comparatively wide.

I claim:

1. The combination of a Garnett toothed strip made in two sections secured together, each section having teeth, the teeth of one section alternating with the teeth of the other section, the base of one toothed strip being of a greater depth than the base of the other toothed strip so as to form an overhanging shoulder.

2. The combination of a Garnett toothed strip having two sets of teeth, one alternating with the other, said strip being made in two sections welded together, one section having one series of teeth and the other section having another series of teeth, one section having an extended shouldered base and the other section having a short base forming an overhanging shoulder adapted to overlap the shoulder of an adjoining convolution.

3. The combination of a Garnett cylinder having a smooth surface; a Garnett toothed strip having two sets of teeth, one set alternating with the other set, said strip having on one side an extended base forming a shoulder and having on the other side an overhanging shouldered portion arranged to overlap the base shoulder of an adjoining convolution, the Garnett cylinder having an overhanging portion, which the first convolution of the toothed strip underlaps.

THOMAS W. ALLEN.